United States Patent
Kim et al.

(10) Patent No.: US 10,996,627 B2
(45) Date of Patent: May 4, 2021

(54) IMAGE DATA PROCESSING METHOD AND APPARATUS

(71) Applicants: SAMSUNG ELECTRONICS CO., LTD., Suwon-si (KR); University of Seoul Industry Cooperation Foundation, Seoul (KR)

(72) Inventors: Yongkyu Kim, Hwaseong-si (KR); Kichul Kim, Seoul (KR); Hojung Kim, Suwon-si (KR); Hyunsik Park, Seoul (KR); Hongseok Lee, Seoul (KR); Hyunwook Ji, Seoul (KR)

(73) Assignees: SAMSUNG ELECTRONICS CO., LTD., Suwon-si (KR); University of Seoul Industry Cooperation Foundation, Seoul (KR)

( * ) Notice: Subject to any disclaimer, the term of this patent is extended or adjusted under 35 U.S.C. 154(b) by 208 days.

(21) Appl. No.: 16/139,969

(22) Filed: Sep. 24, 2018

(65) Prior Publication Data

US 2019/0113886 A1 Apr. 18, 2019

(30) Foreign Application Priority Data

Oct. 13, 2017 (KR) .......... 10-2017-0133473

(51) Int. Cl.
*G03H 1/16* (2006.01)
*G03H 1/08* (2006.01)
*G09G 3/00* (2006.01)
*G06F 17/14* (2006.01)
*G02B 27/28* (2006.01)

(52) U.S. Cl.
CPC .......... *G03H 1/16* (2013.01); *G03H 1/08* (2013.01); *G03H 1/0808* (2013.01); *G06F 17/142* (2013.01); *G09G 3/003* (2013.01); *G02B 27/28* (2013.01); *G03H 2001/0833* (2013.01); *G03H 2210/30* (2013.01); *G03H 2210/454* (2013.01); *G03H 2226/02* (2013.01); *G09G 2340/0407* (2013.01)

(58) Field of Classification Search
CPC ......... G03H 1/2294; G03H 2001/0224; G03H 2001/2297; G03H 1/16
See application file for complete search history.

(56) References Cited

U.S. PATENT DOCUMENTS

| | | | |
|---|---|---|---|
| 2009/0128619 A1* | 5/2009 | Mash | G03H 1/2294 348/40 |
| 2009/0180165 A1* | 7/2009 | Haussler | G03H 1/2294 359/9 |
| 2010/0091995 A1* | 4/2010 | Chen | H04L 63/0492 380/278 |
| 2015/0036199 A1* | 2/2015 | Leister | G03H 1/268 359/9 |
| 2017/0091916 A1 | 3/2017 | Kim et al. | |

FOREIGN PATENT DOCUMENTS

| | | |
|---|---|---|
| JP | 5096397 B2 | 12/2012 |
| KR | 10-2011-0068763 A | 6/2011 |
| KR | 10-1366116 B1 | 2/2014 |
| KR | 10-2017-0038520 A | 4/2017 |

* cited by examiner

*Primary Examiner* — Vincent Rudolph
*Assistant Examiner* — Raphael Schwartz
(74) *Attorney, Agent, or Firm* — Sughrue Mion, PLLC

(57) ABSTRACT

With regard to image data processing, a method of obtaining a focus term by using periodicity of the focus term is provided. The focus term may be used in a plurality of operation processes for processing image data.

12 Claims, 6 Drawing Sheets

IMAGE DATA PROCESSING METHOD AND APPARATUS

CROSS-REFERENCE TO RELATED APPLICATION

This application claims priority from Korean Patent Application No. 10-2017-0133473, filed on Oct. 13, 2017, in the Korean Intellectual Property Office, the disclosure of which is incorporated herein in its entirety by reference.

BACKGROUND

1. Field

Apparatuses and methods consistent with exemplary embodiments relate to image data processing.

2. Description of the Related Art

In recent years, many studies have been done on three-dimensional (3D) image-related technology. Devices for implementing high-quality holograms in real time by using a complex spatial light modulator (SLM) capable of controlling the amplitude and phase of light at the same time have also been studied.

Computer-generated holograms (CGH) have recently been used to reproduce holographic moving images, and image data processing apparatuses may be used to calculate hologram values for positions on a hologram plane. However, these methods require a huge number of computations. In some cases, data processing apparatuses must perform complicated operations, such as Fourier transforms, in order to express a point in a space.

An image data processing apparatus, such as a television (TV), a mobile device, or the like, may process image data to reproduce holographic images. In these cases, an image data processing apparatus may perform a Fourier transform on image data and reproduce an image based on transformed data.

When image data processing is performed, a significant amount of time is required to perform the large number of computations. Thus, in view of the limited size and available power of portable devices, there is a need for a reduction in the number of computations and time required for performing image data processing.

SUMMARY

One or more exemplary embodiments may provide methods and apparatuses for more efficiently processing image data.

Additional exemplary aspects and advantages will be set forth in part in the description which follows and, in part, will be apparent from the description, or may be learned by practice of the presented exemplary embodiments.

According to an aspect of an exemplary embodiment, an image data processing apparatus includes: a receiver configured to receive image data including depth information and color information of an object; a processor configured to perform 1D Fast Fourier Transform (FFT) one or more times on the image data based on a first distance, perform scaling using a first constant on the image data obtained by performing 1D FFT one or more times, and control a display to display the object by performing an operation using a focus term used for focusing the image on the image data obtained by performing scaling, and a display configured to display the object under control of the processor.

The processor may be further configured to perform scaling using a second constant determined based on the first constant, on the image data obtained by performing the operation using the focus term and control the display to display the object by using the image data obtained by performing scaling using the second constant.

The processor may be further configured to perform 1D FFT on the image data obtained by performing scaling using the second constant one or more times based on a second distance, perform scaling using a third constant determined based on the first constant and the second constant on the image data obtained by performing 1D FFT one or more times based on the second distance, and control the display to display the object by using the image data obtained by performing scaling using the third constant.

The processor may be further configured to perform 1D FFT on the image data in a horizontal direction and perform 1D FFT on the image data in a vertical direction.

The processor may be further configured to perform 1D FFT on the image data in a first direction, perform scaling using a fourth constant on the image data obtained by performing 1D FFT in the first direction, and perform 1D FFT on the image data obtained by performing scaling using the fourth constant in a second direction.

The first distance may correspond to a distance between a pupil and a retina.

The processor may be further configured to perform 1D FFFT on the image data obtained by performing scaling using the second constant in a horizontal direction and perform 1D FFT on the image data obtained by performing scaling using the second constant in a vertical direction.

The second distance may correspond to a distance between the display and a pupil.

The processor may be further configured to perform 1D FFT on the image data obtained by performing scaling using the second constant in a first direction, perform scaling using a fifth constant on the image data obtained by performing 1D FFT in the first direction, and perform 1D FFT on the image data obtained by performing scaling using the fifth constant in a second direction.

At least one of the first constant, the second constant, and the third constant may be determined according to a memory size used in processing the image data.

The processor may be further configured to control the display to display a hologram image that is a three-dimensional (3D) image of the object.

According to an aspect of another exemplary embodiment, an image data processing method includes: receiving image data including depth information and color information of an object; performing 1D Fast Fourier Transform (FFT) one or more times on the image data based on a first distance; performing scaling using a first constant on the image data obtained by performing 1D FFT one or more times; and displaying the object by performing an operation using a focus term used for focusing the image on the image data obtained by performing scaling.

According to an aspect of another exemplary embodiment, there is provided a non-transitory computer-readable recording medium having recorded thereon a program for performing, when executed by a computer, the image data processing method.

BRIEF DESCRIPTION OF THE DRAWINGS

These and/or other exemplary aspects and advantages will become apparent and more readily appreciated from the following description of the exemplary embodiments, taken in conjunction with the accompanying drawings in which.

DETAILED DESCRIPTION

Reference will now be made in detail to exemplary embodiments presented only for illustration, with reference to the accompanying drawings. The exemplary embodiments are merely described below to explain aspects and are not intended to limit the scope of claims. What one of ordinary skill in the art may easily infer from the detailed description and the exemplary embodiments is construed as being included in the scope of claims. As used herein, the term "and/or" includes any and all combinations of one or more of the associated listed items. Expressions such as "at least one of," when preceding a list of elements, modify the entire list of elements and do not modify the individual elements of the list.

The terms "comprise" or "include" used herein should not be construed as including all of various elements or operations described in the specification, and should be construed as not including some of the various elements or operations or as further including additional elements or operations.

While such terms as "first" and "second" may be used herein to describe various elements, such elements must not be limited to the above terms. The above terms are used only to distinguish one element from another. Also, terms including ordinal numbers may be interpreted as different elements in different drawings, unless otherwise described, but are not limited thereto.

The present exemplary embodiments relate to rendering methods and apparatuses, and detailed descriptions of information widely known to one of ordinary skill in the art are omitted.

Hereinafter, exemplary embodiments will be described in detail with reference to the accompanying drawings.

Figure 1:
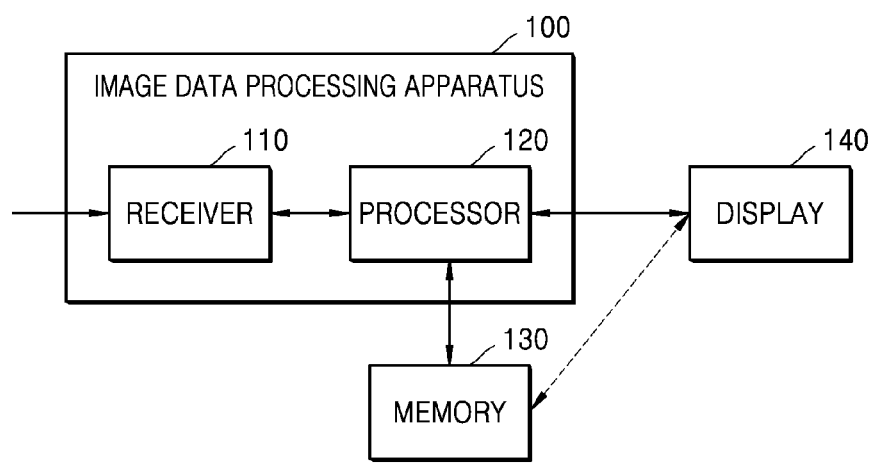
FIG. 1 is a block diagram of configurations of an image data processing apparatus according to an exemplary embodiment.

FIG. 1 is a block diagram of configurations of an image data processing apparatus 100 according to an exemplary embodiment. It will be understood by one of ordinary skill in the art that other general elements may be further included in addition to the elements illustrated in FIG. 1.

Referring to FIG. 1, the image data processing apparatus 100 may include a receiver 110 and a processor 120. Additionally, the image data processing apparatus 100 may include a memory 130 and/or a display 140. The display 140 may display an image under control of the processor 120. The display 140 may receive data from the processor 120 and display an image. Alternatively, the display 140 may display an image by using data received directly from the memory 130 under control of the processor 120.

The processor 120, according to an exemplary embodiment, may perform a layer-based algorithm. The processor 120 may perform calculations by splitting a reproduction region of a hologram into layers based on depth. The processor 120 may perform a Fourier transform, a fast Fourier transform (FFT), an inverse Fourier transform, or an inverse fast Fourier transform (IFFT) on each layer. For example, the processor 120 may obtain data regarding one pixel of a hologram image by performing an FFT more than twice. The FFT described below may include a Fourier transform.

A coordinate value, according to an exemplary embodiment, may vary based on a criterion. Accordingly, even coordinate values corresponding to the same pixel may be different depending on the criterion. For example, while a coordinate value of a hologram image corresponding to a location on the display 140, is a first coordinate value (x1, y1), a coordinate value of the hologram image corresponding to a location of the pupil is a second coordinate value (u, v), and a coordinate value of the hologram image corresponding to a location of the retina is a third coordinate value (x2, y2). The first coordinate value (x1, y1), the second coordinate value (u, v), and the third coordinate value (x2, y2), all corresponding to the same pixel, may be different from one another.

The processor 120 according to an exemplary embodiment may use a focus term to process image data. The focus term may be used in focusing a hologram image. The processor 120 may perform a first Fourier transform, which is an FFT related to a region from the display 140 to the pupil. Also, the processor 120 may perform a second Fourier transform, which is an FFT related to a region from the pupil to the retina. The processor 120 may use a value, obtained by multiplying a result of the first Fourier transform by the focus term, as an input of second Fourier transform. The focus term may be obtained from a lookup table. For example, the processor 120 may obtain a focus term corresponding to the second coordinate value (u, v) from a lookup table stored in the memory 130.

The receiver 110, according to an exemplary embodiment, may receive image data. The image data received by the receiver 110 may include depth information and color information of an object. For example, the image data may include depth information and color information of each pixel of an object to be displayed.

An exemplary embodiment in which an FFT is performed will be described below. No additional detailed description is included of an IFFT being performed since it is substantially an inverse of the case in which the FFT is performed.

The processor 120, according to an exemplary embodiment, may perform a 1D FFT on the image data received by the receiver 110 one or more times based on a first distance.

The first distance may be a predetermined distance. For example, the first distance may correspond to a distance between a pupil and a retina.

The processor 120 may perform a 1D FFT on the image data received by the receiver 110 in a first direction based on the first distance and may perform a 1D FFT on the image data received by the receiver 110 in a second direction. For example, the processor 120 may perform a 1D FFT in a horizontal direction and a 1D FFT in a vertical direction. As another example, the processor 120 may perform a 1D FFT in the vertical direction and a 1D FFT in the horizontal direction.

As will be described below, the processor 120 may perform scaling on the data obtained by performing the 1D FFT in the first direction and may perform the 1D FFT on the data obtained by performing scaling in the second direction.

The processor 120 may perform scaling, by using a first constant, on the data obtained by performing the 1D FFT one or more times based on the first distance.

For example, the processor 120 may perform an operation, by the first constant, to multiply the data obtained by performing 1D FFT one or more times based on the first distance.

When performing scaling, the processor 120 according to an exemplary embodiment may allow a size of the data obtained as a result of performing scaling not to exceed a memory size. For example, a value of the first constant may be determined based on the memory size. An overflow may be prevented by determining the first constant such that the size of the data obtained as a result of performing scaling does not exceed the memory size.

The processor 120 may perform scaling before performing the operation using the focus term, thereby reducing data loss during a process of performing the operation. For example, when a FFT is performed, since a data value may be reduced, the processor 120 may perform scaling, according to the first constant, on the data obtained by performing a 1D FFT in the first direction and may perform a 1D FFT on the data obtained by performing scaling in the second direction. The processor 120 may use the focus term to perform the operation on the data obtained by performing 1D FFT in the second direction and may perform scaling, according to a second constant, on the data obtained by performing the operation using the focus term. In this case, the second constant may be determined according to the first constant. For example, a product of the first constant and the second constant may be a predetermined value.

The processor 120 may perform scaling even before performing the operation using the focus term as described above, thereby reducing data loss during the process of performing the operation in the same memory size.

The image data processing apparatus 100 may perform 1D FFT a plurality of times to reduce data loss during the process of performing the operation by performing scaling after performing 1D FFT each time, before performing the 1D FFT again, and may repeat this a plurality of times. For example, when an FFT is performed, since the data value may be reduced, the image data processing apparatus 100 may then perform scaling, according to the first constant, on the data obtained by performing a 1D FFT in the first direction (e.g., the horizontal direction). The data processing apparatus 100 may then perform a 1D FFT on the data obtained by performing scaling in the second direction (e.g., the vertical direction).

The data value may be reduced when the FFT is performed. Thus, when a 1D FFT in the first direction (e.g., the horizontal direction) and a 1D FFT in the second direction (e.g., the vertical direction) are performed consecutively, a resulting value of the operations may be too small to cause a data loss. When a fixed point method is used, the loss may increase. Accordingly, the image data processing apparatus 100 may perform scaling between performing the 1D FFT in the first direction (e.g., the horizontal direction) and performing the 1D FFT in the second direction (e.g., the vertical direction) to greatly adjust a resultant value of the operation, thereby reducing data loss.

The processor 120 may control the display 140 to display the object by performing the operation, on the data obtained by performing scaling using the first constant, using the focus term used for focusing an image.

For example, the processor 120 may perform the operation according to the focus term, and then perform scaling, a 1D FFT one or more times, and scaling again to process the image data and display the object.

The display 140 may display the object under control of the processor 120. An image displayed by the display 140 may be a three-dimensional (3D) image. For example, the display 140 may display a hologram image that is a 3D image of the object.

Hereinafter, a method in which the image data processing apparatus 100 processes image data by performing a plurality of scaling operations will be described. In particular, a method of reducing data loss during a process of performing an operation according to a focus term by performing scaling before performing the operation, or by performing scaling while performing a 1D FFT a plurality of times, is disclosed.

Figure 2:
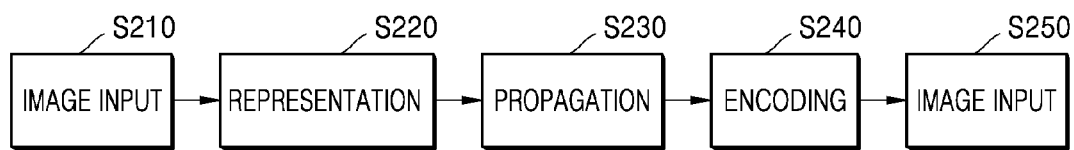
FIG. 2 is a flowchart of a process of processing image data via the image data processing apparatus according to an exemplary embodiment.

FIG. 2 is a flowchart of a process of processing image data via the image data processing apparatus 100 according to an exemplary embodiment. Referring to FIG. 2, the image data processing apparatus 100 may receive image data and may output an image corresponding to the received image data.

FIG. 2 may relate to an exemplary embodiment in which the image data is processed according to a layer-based algorithm but it is not limited thereto.

The image data processing apparatus 100 may generate a hologram image. According to a holographic technique used for generating a hologram according to an exemplary embodiment, image data may be recorded on a recording medium in the form of an interference pattern according to interference between light emitted from a laser and reflected from an object and light emitted from the laser and reflected from a reflector. A result of the holography technique may be referred to as the hologram. When reconstructing an image stored in the hologram, reference light having the same wavelength and phase as light used in recording the image may be again irradiated onto the recording medium. It is thereby possible to artificially generate the hologram. For example, computer-generated holography (CGH) is a technique capable of reproducing a hologram using a general computer by mathematically modeling existing optical systems and optical variables. CGH may be used in real time to generate a digital hologram that actually contains the same 3D image data. To generate the hologram using CGH, since a considerable amount of data must be computed in real time, high speed data processing may be important.

The image data processing apparatus 100 may perform any of various types of algorithms for calculating the digital hologram in real time and generating the digital hologram at a high speed. For example, mathematical models for computing CGH include a point cloud algorithm, a polygon algorithm, and a layer-based algorithm, among others. A point cloud algorithm is a method of representing a 3D image as a spatial set of points, and thus is suitable for representing an object with various surfaces. A polygon algorithm is a representation of surfaces of a 3D image as polygons. Since the polygon algorithm uses FFT, the polygon algorithm requires a comparatively small amount of computation as compared to the point cloud algorithm. A layer-based algorithm is a method of dividing a hologram into layers and calculating a reproduction region of the hologram by a depth reference and may generate a hologram by performing an FFT or an IFFT on each layer.

In order to view a layer-based holographic display as an image, as shown in FIG. 2, a propagation operation is performed of converting and correcting input image data, having depth information and color information, in accordance with a layer based hologram and performing two FFT operations for each depth. Then, in order to display the image, the image may be output after converting complex data into an integer value through encoding.

Of all the algorithms shown in FIG. 2, operation S230 may occupy more than 80% of all the operations, and thus, its power consumption may also be greatest. Also, in operation S230, an FFT operation between a screen and a pupil, a focus term operation to express the image in the pupil, and an FFT operation between the pupil and the retina may be performed.

Hereinafter, each operation will be described in detail.

In operation S210, the image data processing apparatus 100 receives image data. For example, when a layer-based algorithm is applied to image data in a CGH operation, the image data may be color data (or a color image), depth data (or a depth image), etc. The color data may be data indicating a plurality of colors of each layer. For example, the color data may be at least one of red data, blue data, and green data. The layer-based algorithm is a method of processing data of each of a plurality of layers by dividing a reproduction region of a hologram into layers based on depth. The image data processing apparatus 100 may perform a Fourier transform or an inverse Fourier transform on data of each layer during a process of generating or displaying a hologram image.

In operation S220, the image data processing apparatus 100 may change the form of the image data received in operation S210 in order to perform the propagation of operation S230. For example, the image data processing apparatus 100 may perform normalization on data received in operation S210. For example, the image data processing apparatus 100 may convert green data, having one value from among 0~255 as received in operation S210, into data having one value from among 0~1.

Alternatively, the image data processing apparatus 100 may perform image quality compensation and a field operation in operation S220. The image data processing apparatus 100 may compensate image data to improve image quality of image data.

In operation S230, the image data processing apparatus 100 may perform a Fourier transform, an FFT, an inverse Fourier transform, or an IFFT.

For example, the image data processing apparatus 100 may perform a Fourier transform on image data in the form of a two-dimensional (2D) matrix. The image data processing apparatus 100 may perform a one-dimensional (1D) Fourier transform twice for the 2D Fourier transform. The image data processing apparatus 100 may perform the 1D Fourier transform on the image data in a horizontal direction, and may the perform the 1D Fourier transform on the transformed image data in a vertical direction. The image data processing apparatus 100 thus generates a holographic image via the Fourier transform.

As another example, the image data processing apparatus 100 may use a focus term while performing a Fourier transform or an IFT a plurality of times. For example, the image data processing apparatus 100 may perform a first FFT and may use a result obtained by multiplying a result of the first FFT by the focus term as an input of a second FFT. As another example, the image data processing apparatus 100 may perform a first IFFT and may use a result obtained by multiplying a result of the first IFFT by the focus term as an input of a second IFFT.

In operation S240, the image data processing apparatus 100 may perform encoding. For example, the image data processing apparatus 100 generates data that is to be inputted to a screen via pixel encoding.

In operation S250, the image data processing apparatus 100 outputs an image via a display. The display may broadly refer to any apparatus for displaying an image.

Figure 3:
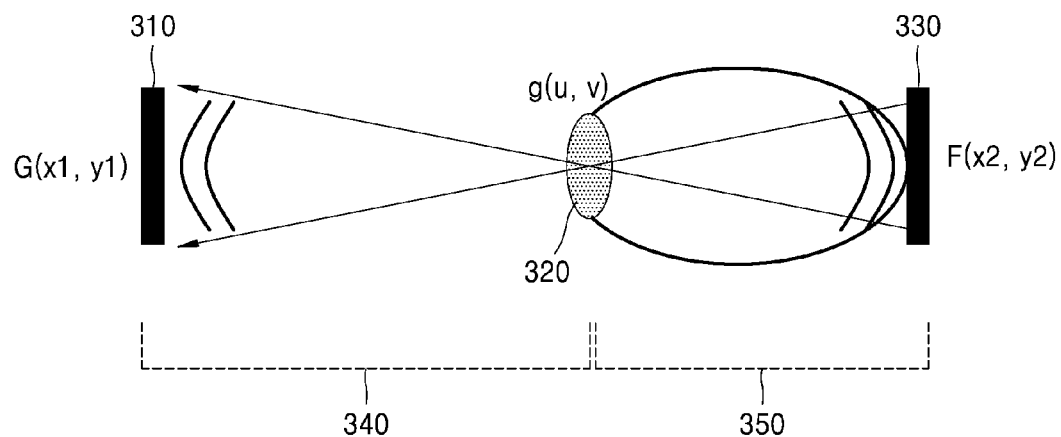
FIG. 3 illustrates a method of performing an operation regarding image data via the image data processing apparatus according to an exemplary embodiment.

FIG. 3 illustrates a method of performing an operation regarding image data via the image data processing apparatus 100 according to an exemplary embodiment. In detail, processing operations in which an image displayed on a display 310 is recognized at a retina 330 via a pupil 320 will be described below.

The image data processing apparatus 100 according to an exemplary embodiment may perform a Fourier transform or an IFFT a plurality of times while processing a hologram image.

For example, the image data processing apparatus 100 may perform a first Fourier transform, which is a Fourier transform regarding a first distance 350 from the pupil 320 to the retina 330. Alternatively, the image data processing apparatus 100 may perform a first IFT, which is an IFT regarding the first distance 350.

As another example, the image data processing apparatus 100 may perform second Fourier transform, which is Fourier transform regarding a second distance 340, which is a section from the display 310 to the pupil 320. Alternatively, the image data processing apparatus 100 may perform second IFT, which is IFT regarding the second distance 340.

The image data processing apparatus 100 according to an exemplary embodiment may use a focus term during a process of performing either a Fourier transform or an IFT a plurality of times.

For example, a value obtained using a first Fourier transform and the focus term may be used as an input of a second Fourier transform. For example, the image data processing apparatus 100 may perform a second Fourier transform by applying a value as an input, where the value is the product of multiplying the result of a first Fourier transform and the focus term. Also, a pixel value used for the hologram image may be determined by using data obtained using second Fourier transform.

As noted above, a coordinate value may vary according to a criterion. Thus, coordinate values corresponding to the same pixel may be different depending on the criterion. For example, a coordinate value of a hologram image corresponding to a location of the display 310 may be a first coordinate value (x1, y1), a coordinate value of the hologram image corresponding to a location of the pupil 320 may be a second coordinate value (u, v), and a coordinate value of the hologram image corresponding to a location of the retina 330 may be a third coordinate value (x2, y2), and the first coordinate value (x1, y1), the second coordinate value (u, v), and the third coordinate value (x2, y2), all corresponding to the same pixel, may be different from one another.

Figure 4:
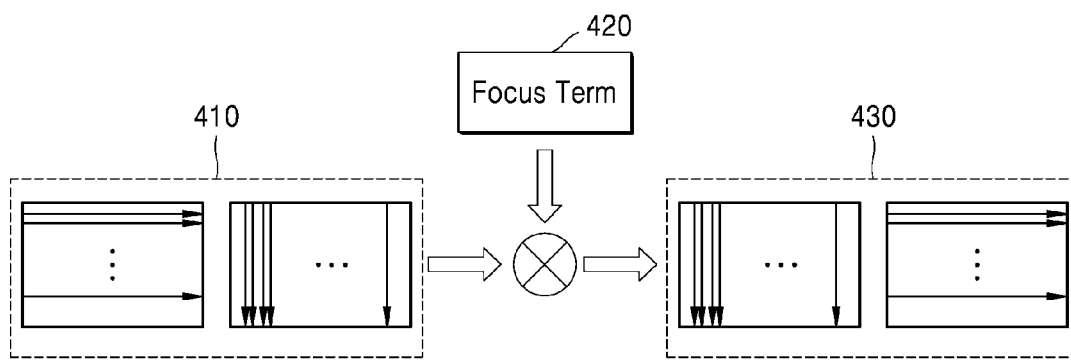
FIG. 4 illustrates a method of processing image data via an image data processing apparatus according to an exemplary embodiment by performing Fourier transform a plurality of times or performing inverse Fourier transform (IFT) a plurality of times.

FIG. 4 illustrates a method of processing image data via the image data processing apparatus 100 according to an exemplary embodiment by performing a Fourier transform or an IFT a plurality of times.

The Fourier transform or the IFT may be performed in a horizontal direction or a vertical direction. Referring to FIG. 4, the image data processing apparatus 100 may perform a 1D FFT or an IFFT twice on image data during an image data processing process. For example, the image data processing apparatus 100 may generate first data by performing a 1D FFT 410 on image data once in each of the horizontal direction and the a vertical direction, and may generate second data by performing a 1D FFT 430, on a value obtained by multiplying the first data by a focus term 420, in each of the horizontal direction and the vertical direction.

As another example, the image data processing apparatus 100 may generate third data by performing a 1D IFFT 410 on the image data in each in of the horizontal direction and the vertical direction, and may generate fourth data by performing a 1D IFFT 430, on a value obtained by multiplying the third data by the focus term 420, in each of the horizontal direction and the vertical direction.

Figure 5:
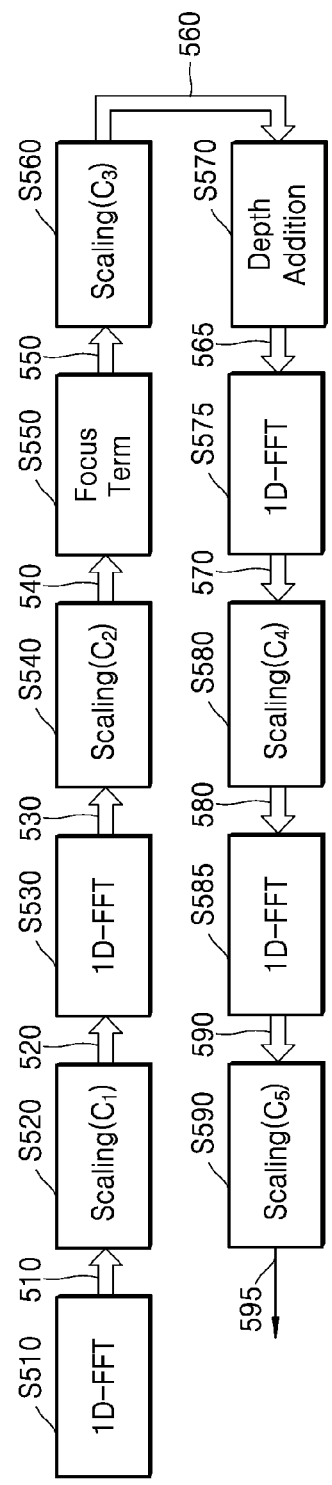
FIG. 5 is a flowchart of a method in which an image data processing apparatus processes image data by performing a plurality of scaling operations before performing an operation of a focus term according to an exemplary embodiment.

FIG. 5 is a flowchart of a method in which the image data processing apparatus 100 processes image data by performing a scaling operations before performing an operation using a focus term according to an exemplary embodiment.

In operation S510, the image data processing apparatus 100 performs a 1D FFT. The 1D FFT may be performed in a predetermined direction. For example, the 1D FFT may be performed in a horizontal direction or in a vertical direction. However, as will be described below, in operation S530, a 1D FFT is performed in a direction different from a direction in which the 1D FFT is performed in operation S510.

As a result of performing the 1D FFT in operation S510, first data 510 may be obtained.

In operation S520, the image data processing apparatus 100 may perform first scaling C1 on the first data 510. First scaling C1 may be performed according to a C1 value. For example, the image data processing apparatus 100 may obtain a value obtained by multiplying the first data 510 by C1.

As a result of performing first scaling C1 in operation S520, second data 520 may be obtained.

In operation S530, the image data processing apparatus 100 performs a 1D FFT. The 1D FFT may be performed in a predetermined direction. For example, the 1D FFT may be performed in the horizontal direction or in the vertical direction. In operation S530, the 1D FFT may be performed in a direction different from the direction in which the 1D FFT is performed in operation S510. For example, when the 1D FFT is performed horizontally in operation S510, the 1D FFT may be performed vertically in operation S530.

Third data 530 may be obtained as a result of performing 1D FFT in operation S530.

In operation S540, the image data processing apparatus 100 may perform second scaling C2 on the third data 530. Second scaling C2 may be performed according to a C2 value. For example, the image data processing apparatus 100 may obtain a value obtained by multiplying the third data 530 by C2.

As a result of performing second scaling C2 in operation S540, fourth data 540 may be obtained.

In operation S550, the image data processing apparatus 100 may perform an operation on the fourth data 540 according to the focus term. The focus term may be a predetermined value. For example, the image data processing apparatus 100 may obtain a product of multiplying the fourth data 540 by the focus term.

Fifth data 550 may be obtained as a result of performing the operation according to the focus term in operation S550.

In operation S560, the image data processing apparatus 100 may perform third scaling C3 on the fifth data 550. Third scaling C3 may be performed according to a C3 value. For example, the image data processing apparatus 100 may obtain a value obtained by multiplying the fifth data 550 by C3.

Sixth data 560 may be obtained as a result of performing third scaling C3 in operation S560.

In operation S570, the image data processing apparatus 100 according to an exemplary embodiment may perform a depth addition. The image data processing apparatus 100 may obtain seventh data 565 by performing the depth addition on the sixth data 560.

In operation S575, the image data processing apparatus 100 performs a 1D FFT. The 1D FFT may be performed in a predetermined direction. For example, the 1D FFT may be performed in the horizontal direction or in the vertical direction. However, as will be described below, in operation S585, 1D FFT is performed in a direction different from a direction in which 1D FFT is performed in operation S575.

Eighth data 570 may be obtained as a result of performing 1D FFT in operation S575.

In operation S580, the image data processing apparatus 100 may perform fourth scaling C4 on the eighth data 570. Fourth scaling C4 may be performed according to a C4 value. For example, the image data processing apparatus 100 may obtain a value obtained by multiplying the eighth data 580 by C4.

Ninth data 580 may be obtained as a result of performing fourth scaling C4 in operation S520.

In operation S585, the image data processing apparatus 100 performs a 1D FFT. The 1D FFT may be performed in a predetermined direction. For example, the 1D FFT may be performed in the horizontal direction or in the vertical direction. In operation S585, the 1D FFT is performed in a direction different from a direction in which the 1D FFT is performed in operation S575. For example, when the 1D FFT is performed horizontally in operation S575, the 1D FFT may be performed vertically in operation S585.

Tenth data 590 may be obtained as a result of performing 1D FFT in operation S585.

In operation S590, the image data processing apparatus 100 may perform fifth scaling C5 on the tenth data 590. Fifth scaling C5 may be performed according to a C5 value. For example, the image data processing apparatus 100 may obtain a value obtained by multiplying the tenth data 590 by C5.

In operation S590, eleventh data 595 may be obtained as a result of performing fifth scaling C5.

C1, C2, C3, C4 and C5 may be determined according to mutual values. For example, a product of C1, C2, and C3 may be maintained as a predetermined value. As another example, a product of C1, C2, C3, C4 and C5 may be maintained as a predetermined value.

The image data processing apparatus 100 according to an exemplary embodiment may determine the values of C1 to C5 such that a size of data obtained as a result of each operation does not exceed a memory size. Alternatively, the image data processing apparatus 100 may determine the values of C1 to C5 such that an amount of data to be lost is reduced in consideration of a predetermined memory size.

Alternatively, the image data processing apparatus 100 may determine the values of C1 to C5 such that the amount of data loss occurring in finally output data is reduced, in consideration of the predetermined memory size. For example, an overflow may be prevented by determining C1 to C5 such that a size of the first data 510 through the eleventh data 595 does not exceed the memory size.

Referring to FIG. 5, the image data processing apparatus 100 according to an exemplary embodiment may perform a plurality of scaling operations, as described.

Specifically, the image data processing apparatus 100 may perform one or more scaling operations before performing an operation using the focus term, thereby reducing data loss during the operation.

A data value may be reduced when an FFT is performed. Therefore, when the FFT in operation S510 and the FFT in operation S530 are performed consecutively, a resultant value of the operation may be too small to cause a data loss. Especially, when a fixed point method is used, the data loss may increase. When a fixed point method is used, when the value is reduced by performing a 1D FFT, loss may occur with respect to data of a prime number less than a predetermined value. Accordingly, the image data processing apparatus 100 may reduce data loss by greatly adjusting an operation result value by performing the first scaling C1 after performing the FFT in operation S510.

The image data processing apparatus 100 may adaptively perform a plurality of scaling operations in consideration of the memory size, thereby reducing data loss.

The image data processing apparatus 100 may perform a scaling operation, to be performed in an encoding operation, instead in first scaling C1 to fifth scaling C5, thereby reducing or omitting the scaling operation to be performed in the encoding operation. For example, the image data processing apparatus 100 may perform a scaling operation, to be performed in gamma correction, in one of the first scaling C1 to fifth scaling C5 operations. As another example, the image data processing apparatus 100 may omit an operation in a normalized block by performing the scaling operation, to be performed in the encoding operation, instead in one of the first scaling C1 to fifth scaling C5 operations.

Figure 6:
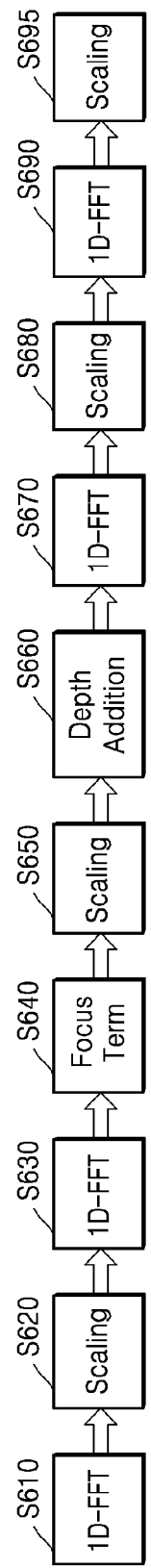
FIG. 6 is a flowchart of a method in which an image data processing apparatus processes image data by performing scaling between 1D FFT in a first direction and 1D FFT in a second direction according to the embodiment.

FIG. 6 is a flowchart of a method in which the image data processing apparatus 100 processes image data by performing scaling between a 1D FFT in a first direction and a 1D FFT in a second direction according to an exemplary embodiment.

Operations described with respect to FIG. 5 may be referred to in connection with FIG. 6. FIG. 6 illustrates the method in which the image data processing apparatus 100, according to an exemplary embodiment, processes the image data by omitting the operation S540 of FIG. 5.

When a scaling constant used for scaling is a 6-1th constant in operation S620, a scaling constant used for scaling is a 6-2th constant in operation S650, a scaling constant used for scaling is a 6-3th constant in operation S680, and a scaling constant used for scaling is a 6-4th constant in operation S695, the 6-1th to 6-4th constants may be determined according to mutual values. For example, a product of the 6-1th constant and the 6-2th constant may be maintained as a predetermined value. As another example, a product of the 6-3th constant and the 6-4th constant may be maintained as a predetermined value. As another example, a product of the 6-1 constants to the 6-4 constants may be maintained as a predetermined value.

Operations S610, S620, S630, S640, S650, S660, S670, S680, S690, and S695 of FIG. 6 respectively correspond to operations S510, S520, S530, S550, S560, S570, S575, S580, S585, and S590 of FIG. 5, and thus detailed descriptions thereof will be omitted for simplicity of the entire description.

Figure 7:
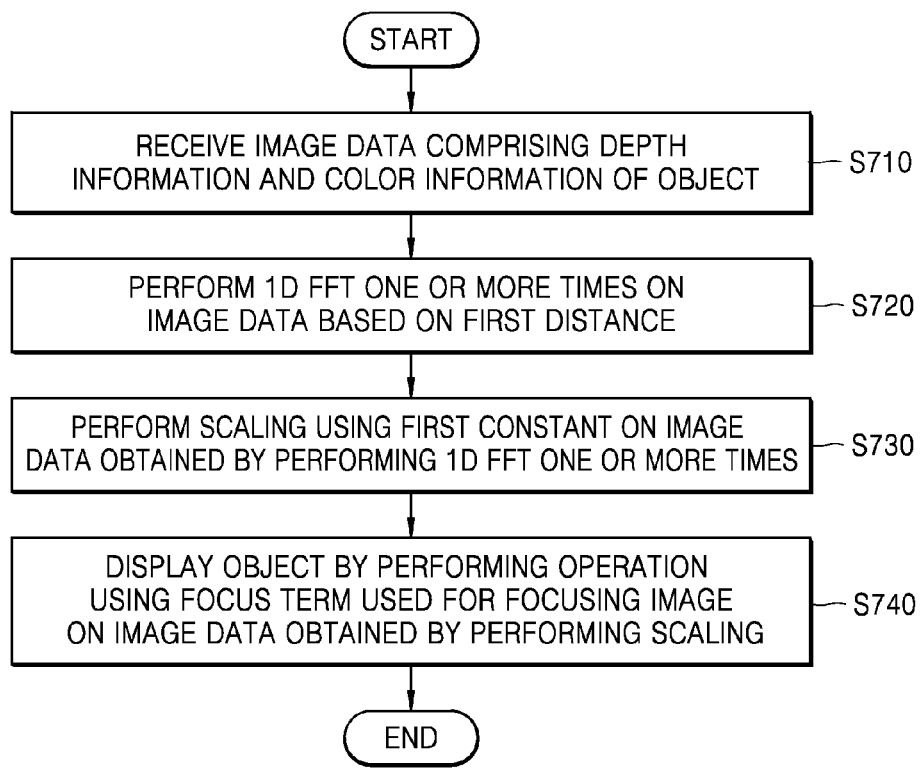
FIG. 7 is a flowchart of a method in which an image data processing apparatus processes image data by performing scaling before performing an operation using a focus term according to an exemplary embodiment.

FIG. 7 is a flowchart of a method in which the image data processing apparatus 100 processes image data by performing scaling before performing an operation using a focus term according to an exemplary embodiment.

In operation S710, the image data processing apparatus 100 according to an exemplary embodiment receives image data including depth information and color information of an object.

The image data received by the image data processing apparatus 100 may include the depth information and the color information of the object. For example, the image data may include depth information and color information of each pixel of an object to be displayed.

In operation S720, the image data processing apparatus 100 according to an exemplary embodiment performs a 1D FFT on the image data one or more times based on a first distance.

The first distance may be a predetermined distance. For example, the first distance may correspond to a distance between a pupil and a retina.

The image data processing apparatus 100 according to an exemplary embodiment performs a 1D FFT on the received image data in a first direction based on the first distance and performs a 1D FFT on the received image data in a second direction. For example, the image data processing apparatus 100 may perform a 1D FFT in a horizontal direction and a 1D FFT in a vertical direction. As another example, the image data processing apparatus 100 may perform a 1D FFT in the vertical direction and a 1D FFT in the horizontal direction.

Also, the image data processing apparatus 100 may perform scaling on data obtained by performing the 1D FFT in the first direction and may perform the 1D FFT in the second direction on the data obtained by performing the scaling.

In operation S730, the image data processing apparatus 100 according to an exemplary embodiment performs scaling, on the data obtained by performing the 1D FFT one or more times in operation S720, by using a first constant.

For example, the image data processing apparatus 100 may perform an operation of multiplying, by the first constant, the data obtained by performing the 1D FFT one or more times based on the first distance.

The image data processing apparatus 100 according to an exemplary embodiment may not allow a size of the data obtained as a result of performing scaling to exceed a memory size when performing scaling. For example, a value of the first constant may be determined based on the memory size. An overflow may be prevented by determining the first constant such that the size of the data obtained as a result of performing scaling does not exceed the memory size.

The image data processing apparatus 100 according to an exemplary embodiment may perform scaling before performing the operation using the focus term, thereby reducing data loss during a process of performing the operation. For example, when an FFT is performed, since a data value may be reduced, the image data processing apparatus 100 may perform scaling, according to the first constant, on the data obtained by performing a 1D FFT in the first direction (e.g. in the horizontal direction) and may perform another 1D FFT, on the data obtained by performing scaling, in the second direction (e.g. in the vertical direction). The image data processing apparatus 100 may perform the operation using the focus term on the data obtained by performing the 1D FFT in the second direction and may then perform another scaling operation, according to a second constant, on the data obtained by performing the operation using the focus term. In this case, the second constant may be determined according to the first constant. For example, a product of the first constant and the second constant may be a predetermined value.

The image data processing apparatus 100 according to an exemplary embodiment may perform scaling even before performing the operation using the focus term as described above, thereby reducing data loss during the process of performing the operation in the same memory size.

The image data processing apparatus 100 according to an exemplary embodiment may perform the 1D FFT a plurality of times, and in order to reduce data loss, a plurality of scaling operations may be performed, alternately, with the plurality of 1D FFT operations. For example, when an FFT is performed, since the data value may be reduced, the image data processing apparatus 100 may perform scaling, according to the first constant, on the data obtained by performing a 1D FFT in the first direction (e.g., the horizontal direction) and may then perform a 1D FFT in the second direction (e.g., the vertical direction), on the data obtained by performing the scaling.

The data value may be reduced when an FFT is performed. Thus, when a 1D FFT in the first direction (e.g., the horizontal direction) and a 1D FFT in the second direction (e.g., the vertical direction) are performed consecutively, a resultant value of the operation may be too small to cause a data loss. In particular, when a fixed point method is used, the loss may increase. Accordingly, the image data processing apparatus 100 may perform scaling between performing the 1D FFT in the first direction (e.g., the horizontal direction) and performing the 1D FFT in the second direction (e.g., the vertical direction), in order to greatly adjust a resultant value of the operation, thereby reducing data loss.

In operation S740, the image data processing apparatus 100 according to an exemplary embodiment may display the object by performing the operation, on the data obtained by performing scaling, using the focus term used for focusing an image.

For example, the image data processing apparatus 100 may perform the operation according to the focus term, and may then perform a scaling operation, a 1D FFT operation one or more times, and another scaling operation to process the image data and display the object.

The image data processing apparatus 100 according to an exemplary embodiment may display the object. An image displayed by the image data processing apparatus 100 according to an exemplary embodiment may be a 3D image. For example, the image data processing apparatus 100 may display a hologram image that is a 3D image of the object. The image data processing apparatus 100 may include a display.

Figure 8:
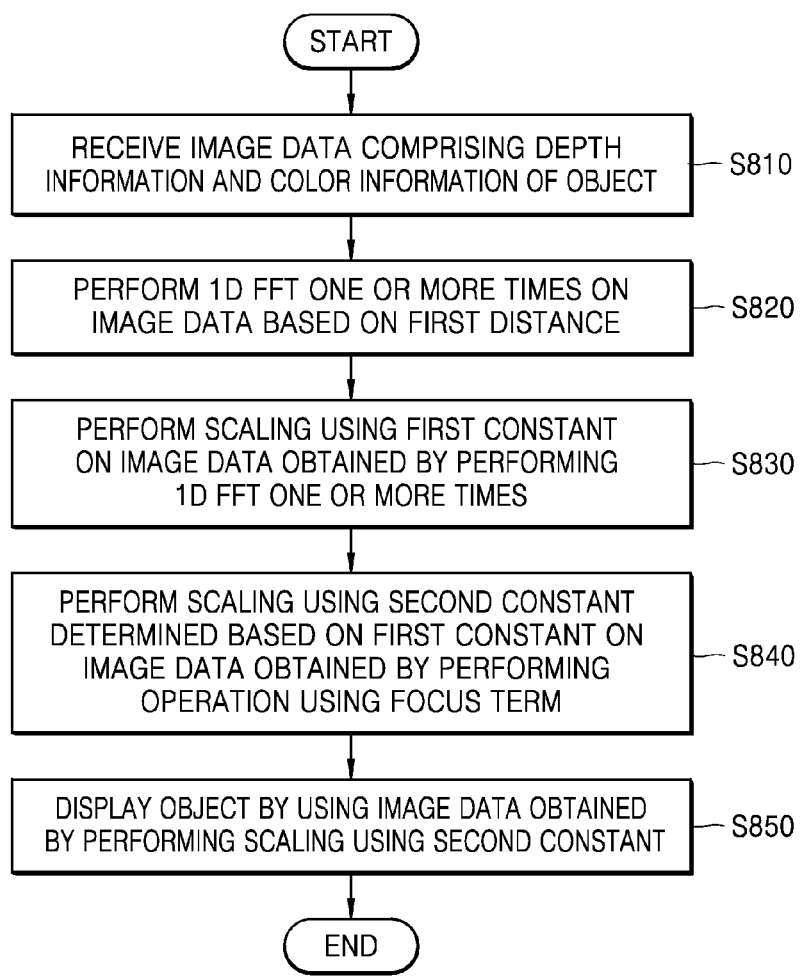
FIG. 8 is a flowchart of a method in which an image data processing apparatus processes image data by performing scaling after performing an operation using a focus term according to a second constant determined according to a first constant according to an exemplary embodiment.

FIG. 8 illustrates a method of processing image data by performing scaling after performing an operation using a focus term according to a second constant determined according to a first constant by the image data processing apparatus 100 according to an exemplary embodiment.

FIG. 8 is a flowchart of a method, according to an exemplary embodiment, in which the image data processing apparatus 100 processes image data by performing scaling after performing an operation using a focus term, where the scaling is performed according to a second constant and the second constant is determined according to a first constant.

Operations described with respect to FIG. 7 may be referred to in connection with FIG. 8. Operations S810, S820, and S830 in FIG. 8 respectively correspond to operations S710, S720, and S730 in FIG. 7, and thus, detailed descriptions thereof will be omitted for simplicity of the entire description.

In operation S840, the image data processing apparatus 100 according to an exemplary embodiment performs scaling on the data obtained by performing the operation using the focus term, where the scaling is performed by using the second constant determined based on the first constant.

The image data processing apparatus 100 according to an exemplary embodiment may perform the operation using the focus term on the data obtained as a result of performing scaling in operation S830. Also, the image data processing apparatus 100 according to an exemplary embodiment may perform scaling using the second constant on the data obtained as a result of performing the operation using the focus term. For example, the image data processing apparatus 100 may perform an operation of multiplying a value by the second constant, where the value is obtained as a result of performing the operation using the focus term.

In operation S850, the image data processing apparatus 100 according to an exemplary embodiment displays an object by using the data obtained by performing scaling using the second constant in operation S840.

The image data processing apparatus 100 according to an exemplary embodiment performs a 1D FFT one or more times on the data obtained by performing scaling using the second constant, i.e., the data obtained in operation S840, based on the second distance.

The image data processing apparatus 100 according to an exemplary embodiment may perform the 1D FFT a plurality of times, an in order to reduce data loss, the image data processing apparatus may perform a plurality of scaling operations, alternating with the plurality of 1D FFT operations. For example, when a FFT is performed, since the data value may be reduced, the image data processing apparatus 100 may perform scaling, according to the first constant, on the data obtained by performing a 1D FFT in a first direction (e.g., a horizontal direction) and may perform a 1D FFT in a second direction (e.g., a vertical direction) on the data obtained by performing scaling. The image data processing apparatus 100 may perform scaling, according to a third constant, on the data obtained by performing 1D FFT in the second direction. In this case, the third constant may be determined according to the first constant and the second constant. For example, a product of the first constant, the second constant, and the third constant may be a predetermined value.

The image data processing apparatus 100 according to an exemplary embodiment may display the object by using data obtained by performing scaling using the third constant.

A constant used for image processing may be obtained by using a memory of a smaller size.

The apparatus described herein may include a processor, a memory for storing and executing program data, a permanent storage unit such as a disk drive, a communications port for handling communications with external devices, and user interface devices, including a touch panel, keys, buttons, etc. When software modules or algorithms are involved, these software modules may be stored as program instructions or computer-readable codes executable on a processor on a computer-readable recording medium. Examples of the computer-readable recording medium include magnetic storage media (e.g., read-only memory (ROM), random-access memory (RAM), floppy disks, hard disks, etc.), and optical recording media (e.g., CD-ROMs, or digital versatile discs (DVDs)). The computer-readable recording medium can also be distributed over network-coupled computer systems so that the computer-readable code is stored and executed in a distributive manner. This media can be read by the computer, stored in the memory, and executed by the processor.

The particular implementations shown and described herein are illustrative examples and are not intended to otherwise limit the technical scope in any way. For the sake of brevity, conventional electronics, control systems, software development and other functional aspects of the systems may not be described in detail. Also, the connecting lines, or connectors shown in the various figures presented are intended to represent exemplary functional relationships and/or physical or logical couplings between the various elements. It should be noted that many alternative or additional functional relationships, physical connections or logical connections may be present in a practical apparatus.

It should be understood that exemplary embodiments described herein should be considered in a descriptive sense only and not for purposes of limitation. Descriptions of features or aspects within each embodiment should typically be considered as available for other similar features or aspects in other embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. An image data processing apparatus comprising:
   a display;
   a receiver configured to receive image data comprising depth information and color information of an image;
   a processor configured to:
      perform a first one-dimensional (1D) Fast Fourier Transform (FFT) in a first direction on the image data, based on a first distance between a pupil and a retina,
      perform scaling, using a first constant, on image data obtained by performing the first 1D FFT,
      perform a second 1D FFT in a second direction on image data obtained by the scaling using the first constant,
      perform, using a focus term, an operation for focusing the image on image data obtained by performing the second 1D FFT,
      perform scaling using a second constant on image data obtained by performing the operation using the focus term,
      perform at least one 1D FFT, on image data obtained by the scaling using the second constant, based on a second distance from the display to the pupil,
      perform scaling using a third constant, on image data obtained by performing the at least one 1D FFT based on the second distance, and
      control the display to display an object by using image data obtained by the scaling using the third constant,
      wherein a product of the first constant, the second constant, and the third constant is a predetermined value.

2. The apparatus of claim 1, wherein the at least one 1D FFT based on the first distance comprises a 1D FFT in a horizontal direction and a 1D FFT in a vertical direction.

3. The apparatus of claim 1, wherein the at least one 1D FFT based on the second distance comprises a 1D FFT performed in a horizontal direction and a 1D FFT performed in a vertical direction.

4. The apparatus of claim 3, wherein:
   the at least one 1D FFT based on the second distance is a 1D FFT in the first direction,
   and the processor is further configured to perform a 1D FFT in the second direction, on image data obtained by performing the scaling using the third constant.

5. The apparatus of claim 3, wherein at least one of the first constant, the second constant, and the third constant is determined according to a size of a memory used in processing the image data.

6. The apparatus of claim 1, wherein the image is a three-dimensional (3D) image.

7. An image data processing method comprising:
   receiving image data comprising depth information and color information of an image;
   performing a first one-dimensional (1D) Fast Fourier Transform (FFT) in a first direction on the image data, based on a first distance between a pupil and a retina;
   performing scaling using a first constant, on image data obtained by performing the first 1D FFT;
   performing a second 1D FFT in a second direction on image data obtained by the scaling using the first constant;
   performing, using a focus term, an operation for focusing the image on image data obtained by performing the second 1D FFT,
   performing scaling using a second constant on image data obtained by performing the operation using the focus term,
   performing at least one 1D FFT, on image data obtained by the scaling using the second constant, based on a second distance from the display to the pupil,
   performing scaling using a third constant, on image data obtained by performing the at least one 1D FFT based on the second distance, and
   controlling the display to display an object by using image data obtained by the scaling using the third constant,
   wherein a product of the first constant, the second constant, and the third constant is a predetermined value.

8. The method of claim 7, wherein the performing the at least one 1D FFT on the image data, based on the first distance comprises:
   performing a 1D FFT on the image data in a horizontal direction; and
   performing a 1D FFT on the image data in a vertical direction.

9. The method of claim 7, wherein the performing the at least one 1D FFT based on the second distance comprises:
   performing a 1D FFT on image data obtained by the scaling using the second constant, in a horizontal direction; and
   performing a 1D FFT on image data obtained by the scaling using the second constant, in a vertical direction.

10. The method of claim 7, wherein:
    the performing the at least one 1D FFT based on the second distance comprises
    performing a 1D FFT on image data obtained by the scaling using the second constant, in the first direction; and
    the method further comprises performing a 1D FFT on image data obtained by the scaling using the third constant, in the second direction.

11. The method of claim 7, wherein at least one of the first constant, the second constant, and the third constant is determined according to a memory size used in processing the image data.

12. A non-transitory computer-readable recording medium having recorded thereon a program for performing a method comprising:
- receiving image data comprising depth information and color information of an image;
- performing a first one-dimensional (1D) Fast Fourier Transform (FFT) in a first direction on the image data, based on a first distance between a pupil and a retina;
- performing scaling using a first constant, on image data obtained by performing the first 1D FFT;
- performing a second 1D FFT in a second direction on image data obtained by the scaling using the first constant;
- performing, using a focus term, an operation for focusing the image on image data obtained by performing the second 1D FFT,
- performing scaling using a second constant on image data obtained by performing the operation using the focus term,
- performing at least one 1D FFT, on image data obtained by the scaling using the second constant, based on a second distance from the display to the pupil,
- performing scaling using a third constant, on image data obtained by performing the at least one 1D FFT based on the second distance, and
- controlling the display to display an object by using image data obtained by the scaling using the third constant,
- wherein a product of the first constant, the second constant, and the third constant is a predetermined value.

* * * * *